United States Patent [19]

Kubota et al.

[11] Patent Number: 4,838,496
[45] Date of Patent: Jun. 13, 1989

[54] MAGNETIC TAPE LOADING METHOD AND APPARATUS

[75] Inventors: Kazuo Kubota; Masaaki Sakaguchi, both of Kanagawa, Japan

[73] Assignee: Fuji Photo Film Co., Ltd., Kanagawa, Japan

[21] Appl. No.: 157,666

[22] Filed: Feb. 19, 1988

[30] Foreign Application Priority Data

Feb. 19, 1987 [JP] Japan .................................. 52-34660

[51] Int. Cl.⁴ ............................................ B65H 18/26
[52] U.S. Cl. .................................. 242/67.1 R; 242/76
[58] Field of Search ................... 242/67.1 R, 56 R, 76, 242/; 156/502, 504, 505

[56] References Cited

U.S. PATENT DOCUMENTS 4,427,166  1/1984  Oishi et al. ........................ 242/199
4,512,527  4/1985  Rehklau et al. .................. 242/56 R Primary Examiner—Stuart S. Levy
Assistant Examiner—Steven M. duBois
Attorney, Agent, or Firm—Sughrue, Mion, Zinn, Macpeak & Seas

[57] ABSTRACT

A method and apparatus for loading a magnetic tape into a cassette in which the tape winding appearance is controlled and improved. Friction sheets are disposed around the hub onto which the tape is to be wound, preferably on both sides of the tape winding area. Compressed air is blown into the cassette to press the friction sheets against the edges of the tape as the tape is wound.

6 Claims, 4 Drawing Sheets

MAGNETIC TAPE LOADING METHOD AND APPARATUS

BACKGROUND OF THE INVENTION

The present invention relates to a magnetic tape loading method and apparatus therefor. More particularly, the invention relates to a magnetic tape loading method and apparatus for initially loading a magnetic tape on a flangeless-type tape winding body in a cassette such as an audio tape cassette, a digital audio cassette or the like.

The known processes for manufacturing magnetic tapes, such as audio cassette tapes, video cassette tapes and the like include a process for winding a magnetic tape of a predetermined width on a small-diameter flangeless type tape winding body such as a reel, a hub or the like, from a roll of "raw" magnetic tape, as an intermediate manufacturing process.

In the case where a magnetic tape is wound on a tape winding body using such a process, various tape winding characteristics such as vibration in the direction of tape thickness, vibration in the direction of tape width, and the like change according to the physical properties of the raw magnetic tape, the physical properties of the tape winding body, and the physical properties of the magnetic tape itself. As a result, a problem arises in regard to the winding appearance (winding condition) of the magnetic tape wound on the tape winding body. In other words, winding difficulties arise so that the edges of the tape are uneven. Particularly, as the tape running speed during winding is increased, the tape edges become more uneven.

Of course, a magnetic tape in which the tape edges are uneven has a poor external appearance when the tape is placed in a magnetic tape cassette. Further, there arises a problem in that the tape edges are easily damaged, thereby inducing various types of problems and causing a deterioration of the electromagnetic conversion characteristics of the tape.

Therefore, in the prior art magnetic tape manufacturing process, all tapes must be visually checked with respect to the winding appearance after the aforementioned loading process. This adds significantly to the total cost and time required in the manufacturing process.

In order to reduce this checking burden, and for the purpose of improving the winding appearance, a method called "cap decorative winding", which is an open-type winding method and which is illustrated in FIG. 7, has been employed for loading a magnetic tape.

FIG. 7 is a schematic perspective view showing a take-up site tape winding body 2.

FIG. 7 shows the winding of a magnetic tape on a flangeless-type tape winding body while the magnetic tape T is pushed on one side by the weight of a cap 15 placed on the tape winding body mounted on a turntable 14 provided with a take-up shaft 4. According to this method, opposite edges of the tape T can be adjusted so that the tape T will have a good winding appearance after being wound on the tape winding body.

However, such an open winding type take-up method involves some risk of tape damage because it requires a process of placing the magnetic tape winding body in the cassette case. Further, the method results in certain assembling difficulties.

Another tape winding method, called "in-cassette winding", "C-0 winding" or "V-0 winding", has been proposed in which the magnetic tape is loaded only in the last step of the cassette assembly process. This method includes steps of assembling all parts in advance, except for the magnetic tape, into a cassette 8 as shown in FIG. 8 to form a unit into which a feed site tape winding body and a take-up site tape winding body connected by a leader tape 10 are inserted in the cassette. The leader tape is cut by use of a take-up apparatus called an "in-cassette winder". One end of a first leader tape is connected to one tape winding body of the cassette, while the other end of the leader tape is temporarily held by a holding member 16. The tape winding body 2, connected to the raw magnetic tape T through another leader tape, is rotated to take up the magnetic tape T. The magnetic tape T is cut off at a predetermined length. Lastly, a terminal end of the wound magnetic tape T is bonded to the other end of the first leader tape 10 to produce the finished article.

The above-described in-cassette winding type take-up method has an excellent manufacturing efficiency, but has disadvantages as follows. First, it is impossible to adjust the edges of the magnetic tape by contact as described above for cap decorative winding. Accordingly, the winding appearance will vary with the physical properties of the tape and the quality of various cassette parts, and hence the winding appearance cannot be controlled and sometimes is poor. Particularly, in the case where the tape winding body is of the flangeless type, it is very difficult to control the winding appearance.

SUMMARY OF THE INVENTION

In view of such circumstances, an object of the present invention is to provide a magnetic tape loading method and apparatus for loading a magnetic tape in which the winding appearance of the magnetic tape is greatly improved, even for so-called in-cassette type winding in which there has heretofore been no effective means for improving the winding appearance.

The foregoing and other objects of the invention have been attained by a magnetic tape loading method for loading a magnetic tape into a cassette case containing a pair of flangeless-type tape winding bodies connected by a leader tape with at least one friction sheet being in contact with an edge of the magnetic tape, characterized in that the magnetic tape is taken up while the tape winding bodies are rotated and while compressed air is fed into the cassette case to thereby press the friction sheet against the edge of the magnetic tape.

The invention further encompasses an apparatus which enables this method to be carried out, that is, a magnetic tape loading apparatus for loading a magnetic tape into a cassette case containing a pair of flange-less type tape winding bodies connected to each other through a leader tape and at least one friction sheet in contact with an edge of the magnetic tape, characterized in that the apparatus is provided with compressed-air feeding means for feeding compressed air into the cassette case from at least one reel shaft insertion hole formed in the cassette case.

DESCRIPTION OF THE PREFERRED EMBODIMENTS

A preferred embodiment of the apparatus according to the invention will be described in detail hereunder.

Figure 1:
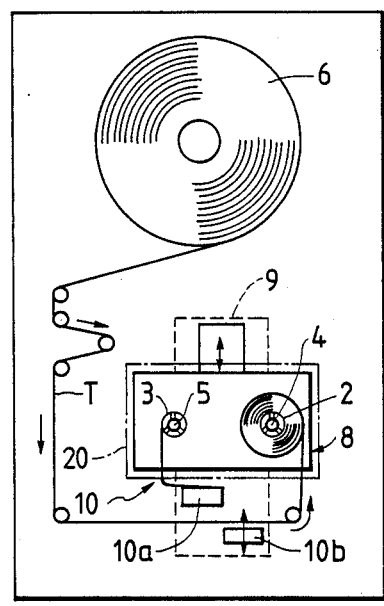
FIG. 1 is a schematic front view of a loading apparatus of a preferred embodiment of the present invention.
Figure 2:
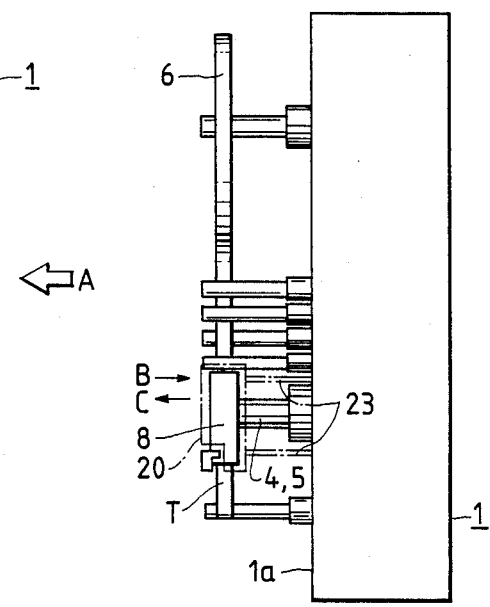
FIG. 2 is a schematic side view taken from the direction of an arrow A in FIG. 1.

FIG. 1 is a schematic front view of a preferred embodiment of an in-cassette winding type magnetic tape loading apparatus, and FIG. 2 is a side view taken from the direction of an arrow A in FIG. 1. The apparatus 1 is used for winding a magnetic tape T on a pair of tape winding bodies 2 and 3 (hereinafter referred to as "hubs") incorporated in advance in, for example, a digital audio tape cassette.

The operation of the tape loading apparatus 1 will now be described.

Figure 3:
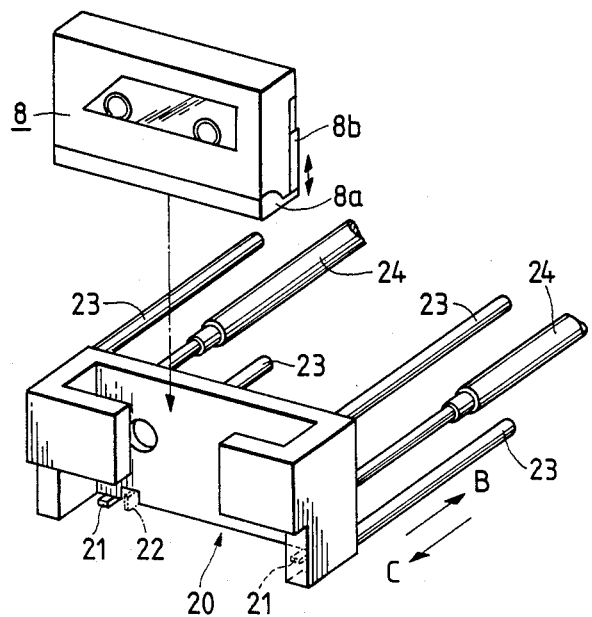
FIG. 3 is an enlarged perspective view of the cassette holder and the magnetic tape cassette depicted in FIG. 1.

A cassette case 8, containing the hubs 2 and 3 connected to each other through a leader tape 10 having a predetermined length, is mounted in a cassette holder 20 of the loading apparatus 1. The structure of the cassette holder 20 is similar to that used in a general recording-/reproducing apparatus. For example, as shown in FIG. 3, when the cassette case 8 is inserted downward into the box-like cassette holder 20, the cassette case 8 is held within the holder by a fitting member 21 provided at a suitable position on a lower end of the holder. In this condition, a guard panel 8a closing a front opening portion of the cassette case 8 is made movable. That is, in this condition, a slidable guard 8b provided at the bottom surface of the cassette case 8 and serving as a guard panel stopper is slid backward corresponding to the insertion of the cassette case 8.

Then, the cassette holder 20 supported, for example, by four slide shafts 23, is moved toward a front panel 1a (in a direction of an arrow B) by the action of two air cylinders 24 so that a driving shaft 4 and a shaft 5 are inserted into the hubs 2 and 3 from reel shaft insertion holes 8c. In this condition, the guard panel 8a is pushed up by a guard panel lever 22 mounted on the front panel 1a so as to be moved corresponding to the motion of the guard panel 8a so that the guard panel 8a is opened to expose the leader tape 10 connecting the hubs 2 and 3.

Then, the leader tape 10 is cut off about at its midpoint. The cut end of the leader tape 10 connected to the hub 2 is bonded through a bonding tape or the like to a forward end of a supply of raw magnetic tape 6. The magnetic tape T is taken up through a predetermined length on the hub 2 and then is cut off, whereafter the cut end of the magnetic tape T is bonded to the cut end of the part of the leader tape 10 connected to the hub 3.

The cutting of the leader tape 10 and the magnetic tape T and the bonding between the leader tape 10 and the magnetic tape T are carried out by a cutting and bonding unit 9 having tape end holding members 10a and 10b, a cutter, a bonding tape supply, etc. The magnetic tape T fed from the supply of raw tape 6 is wound on the hub 2 through a path defined by various guide pins and guide rollers.

Figure 7:
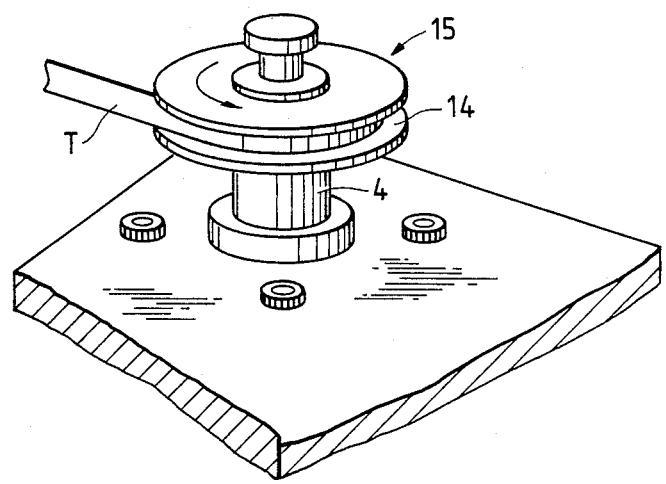
FIG. 7 is a partially perspective view illustrating a prior art open-winding type loading method.
Figure 8:
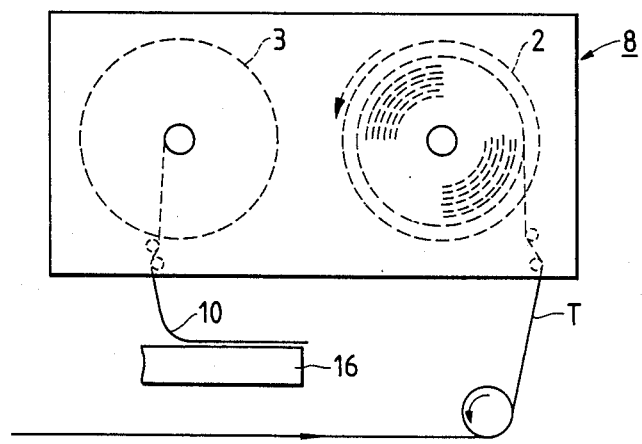
FIG. 8 is a schematic plan view describing a prior art in-cassette winding type loading method.

After the magnetic tape T bonded to the leader tape 10 of the hub 3 has been taken up on the hub 2, the cassette holder 20 is moved in the direction of an arrow C in FIG. 7 (in the opposite direction to the arrow B) through the action of the air cylinders 24. The connection between the driving shaft 4 and the hub 2 and the connection between the shaft 5 and the hub 3 are released so that the guard panel 8a is allowed to close the front opening portion of the cassette case again. Then, the fitting members 21 by which the cassette case 8 is held move backward to the rear of the cassette holder so that the cassette case 8 can be removed from the lower part of the holder.

The cutting and bonding unit 9 is omitted for clarity of illustration in FIGS. 2 and 3. The invention will be described more in detail with reference to FIGS. 4 and 5. The aforementioned cassette holder 20 and the like are not shown in FIGS. 4 and 5 for convenience of description.

Figure 4:
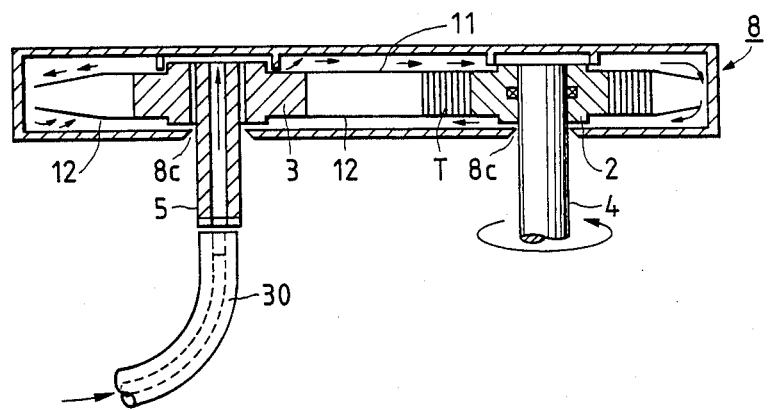
FIG. 4 is a partly sectional view showing the operation of the apparatus depicted in FIGS. 1 and 2.

FIG. 4 is a schematic sectional view showing the driving shaft 4, which is rotated by a driving device (not shown) such as a motor or the like, under the condition where the driving shaft 4 and the shaft 5 are inserted into the cassette case 8. The shaft 5 is hollow. One end of the shaft 5 is connected to a pipe 30 connected to a pressure pump (not shown) to thereby form a compressed air feeding arrangement for feeding compressed air into the cassette case 8.

When compressed air is fed into the cassette case 8 in this manner, the air from the forward end of the shaft 5 strikes the upper surface of the inside case wall opposite the forward end of the shaft 5, and then spreads in all directions against the side opposite that contacting the type of an upper friction sheet 11 (in the space between the wall surface and the friction sheet 11) along the upper wall surface. In this condition, the upper friction sheet 11, which is flexible, is pressed by the compressed air so as to be suitably curved toward the inside of the case. After the air flows along the upper wall surface of the air flows along the side wall surface of the cassette case 8 and then flows along the bottom wall surface thereof to press a lower friction sheet 12 towards the inside of the case in the same manner as the upper friction sheet. Thereafter, the air flows out of the case from the front opening portion of the cassette case.

When the magnetic tape T is wound on the hub 2 through the rotation of the driving shaft 4 under the condition that the upper and lower friction sheets are pressed by compressed air toward the inside of the case as described above, the winding position of the magnetic tape T with respect to the hub 2 and the winding appearance thereof are very good because the positions of the upper and lower edges of the magnetic tape T are controlled by the respective friction sheets.

The air pressure, the air flow rate and the like of the compressed air are not specifically limited. For example, they can be established corresponding to the tape winding speed, the characteristics of the friction sheets 11 and 12, such as thickness, hardness, smoothness and the like, and other factors, such as the internal structure of the cassette case. Further, the shaft 5 need not always be completely fixed and may be movable if necessary. For example, the shaft 5 may be connected to the pipe through a rotary joint.

Figure 5:
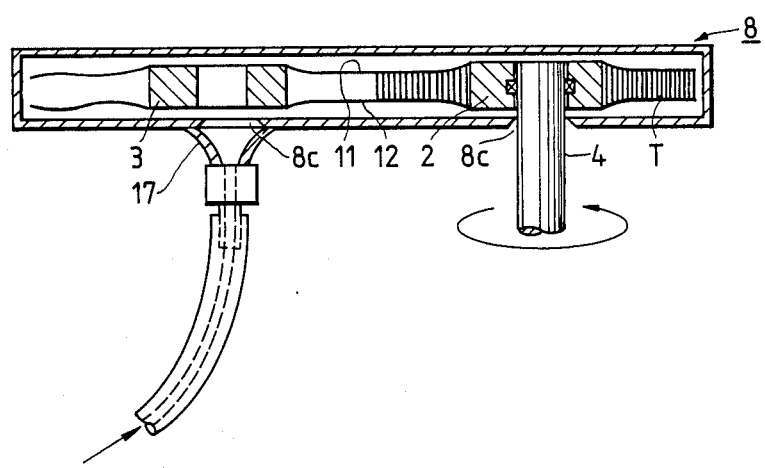
FIGS. 5, 6 and 9 are partly sectional views showing other embodiments of the invention.

Although the above embodiment has been described with reference to the case where compressed air is fed through the shaft 5, it is to be understood that the invention is not limited thereto and that, for example, a funnel-shaped pipe covering the reel shaft insertion hole 8c as shown in FIG. 5, that is, a funnel-like member 17 having suitable flexibility, may be placed in contact with the outside surface of the case.

Figure 9:
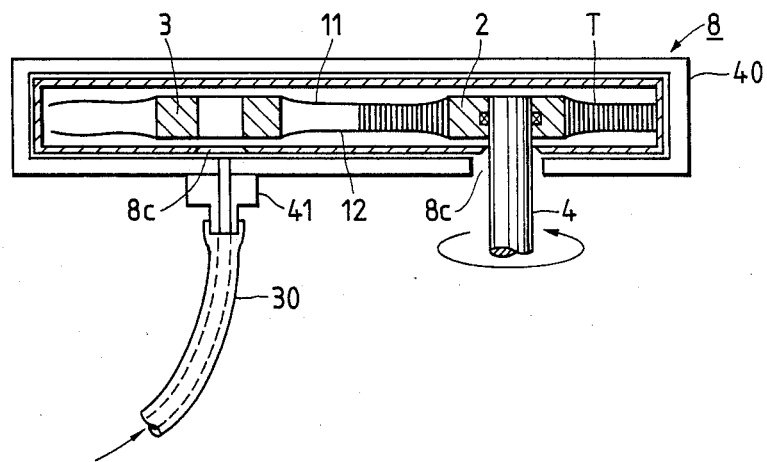

Further, as shown in FIG. 9, the cassette case 8 may be substantially entirely covered by a cassette holder 40. The cassette holder 40 is provided with a flat nozzle 41 so that the flat nozzle 41 is positioned substantially directly under one of the reel shaft insertion holes 8c when the holder 40 covers the cassette case 8. One end of the flat nozzle 41 is coupled to the pipe 30 to thereby flow the compressed air into the cassette case 8 through the flat nozzle 41 and the hole 8c.

By providing such a rotary joint with a hollow driving shaft 4, the compressed air can be fed from the driving shaft 4. For example, by feeding the air from two places into the cassette case 8, the effect provided by the compressed air can be enhanced.

Further, although the above embodiment has been discussed with reference to the case where two friction sheets (upper and lower) are provided, the invention is applicable to the case where only one friction sheet is provided. Furthermore, the friction sheet need not be flexible as described above, and may be formed of a plate-like member having a suitable stiffness.

Figure 6:
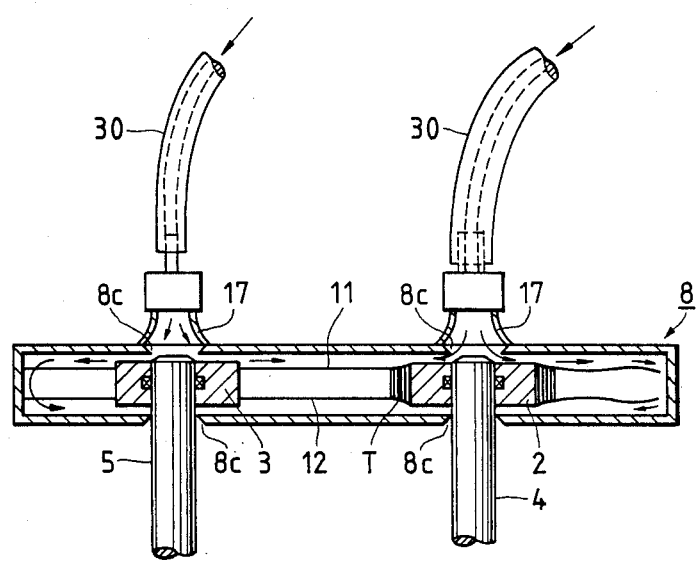

Still further, although in the above-described preferred embodiment the invention is applied to a digital audio tape cassette, it is a matter of course, as previously described, that the invention can be applied to a Philips-type audio tape cassette. In the case where the invention is applied to such a magnetic tape cassette, the funnel-like members 17 can be fitted to the reel shaft insertion holes 8c from the reverse side to the shafts 4 and 5 as shown in FIG. 6 because the reel shaft insertion holes 8c open both to the front and the rear sides of the cassette case. Accordingly, it is easy to feed compressed air from both reel shaft insertion holes 8c.

As described above, according to the invention, when in-cassette winding of the magnetic tape cassette containing a pair of flangeless type hubs and at least one friction sheet is to be carried out, the edges of the magnetic tape are pressed by the friction sheets through the action of compressed air fed into the cassette case to thereby control the winding behavior of the tape and to obtain therefore a remarkably improved winding appearance.

The following example serves to illustrate more clearly the preferred embodiment of the present invention.

EXAMPLE

A digital audio tape cassette was used as the magnetic tape cassette. In-cassette winding was carried out upon the cassette by use of an air feeding structure as shown in FIG. 6.

The upper friction sheet was formed of 50 μm thick polyethylene, and the lower friction sheet was formed of 80 μm thick hypermolecular polyethylene.

The pressure of the compressed air was 1.5 kg/cm$^2$. An estimation of the winding appearance was made under the conditions that the winding speed of the tape and the number of friction sheets were as shown in the Table below.

In the Table, A indicates "very good", B "good", C "slightly poor", and D "very poor".

It is apparent from the Table that Samples 1 to 4 according to the invention were superior in winding appearance to comparative Samples 5 and 6.

What is claimed is:

1. In a magnetic tape loading method for loading a magnetic tape into a cassette case containing a pair of flangeless-type tape winding bodies connected to each other through a leader tape and at least one friction sheet contacting with an edge of said magnetic tape, the improvement wherein said magnetic tape is wound while said tape winding bodies are rotated while compressed air is fed into said cassette case to thereby press said friction sheet against said edge of said magnetic tape.

2. The magnetic tape loading method according to claim 1, wherein a pair of friction sheets formed of a flexible material are provided so as to be respectively in contact with opposite edges of said magnetic tape, and said magnetic tape is wound while said friction sheets are pressed by said compressed air, said compressed air being fed from a reel shaft insertion hole.

3. In a magnetic tape loading apparatus for loading a magnetic tape into a cassette case containing a pair of flangeless-type tape winding bodies connected to each other through a leader tape and at least one friction sheet contacting an edge of said magnetic tape, the improvement wherein said apparatus is provided with compressed air feeding means for feeding compressed air into said cassette case from at least one reel shaft insertion hole of said cassette case during winding of tape on at least one of said tape winding bodies, such that said compressed air enters a space formed between an inner wall surface of said cassette case and the friction sheet to thereby press said friction sheet against said edge of said magnetic tape.

4. The magnetic tape loading apparatus according to claim 3, wherein said compressed air feeding means comprises a fitting end connected to said reel shaft insertion hole, said fitting end being formed of a hollow shaft fitted into said reel shaft insertion hole.

5. The magnetic tape loading apparatus according to claim 3, wherein said compressed air feeding means comprises a fitting end connected to said reel shaft insertion hole, said fitting end being formed of a funnel-shaped pipe to cover said reel shaft insertion hole from the outside of said cassette case.

6. The magnetic tape loading apparatus according to claim 3, wherein said cassette case 8 is substantially covered by a cassette holder and wherein said compressed air feeding means comprises a flat nozzle provided on said cassette holder and aligned with said reel shaft insertion hole.

* * * * *

UNITED STATES PATENT AND TRADEMARK OFFICE
CERTIFICATE OF CORRECTION

PATENT NO. : 4,838,496

DATED : JUNE 13, 1989

INVENTOR(S) : KUBOTA ET AL.

It is certified that error appears in the above-identified patent and that said Letters Patent is hereby corrected as shown below: Title page:

Under "Foreign Application Priority Data", change Japanese Patent Application from "52-34660" to --62-34660--.

Signed and Sealed this

Twenty-sixth Day of June, 1990

Attest:

HARRY F. MANBECK, JR.

Attesting Officer

Commissioner of Patents and Trademarks